PCM SIGNALING BETWEEN CENTRAL OFFICES EMPLOYING
MEANS TO PREVENT UNWANTED RINGING AND TO
PROVIDE PROMPT DISCONNECTION OF
RINGING SIGNALS

Filed Dec. 14, 1964 5 Sheets-Sheet 1

INVENTORS G. W. KINDER
A. C. LONGTON
BY R. B. Ardis
ATTORNEY

PCM SIGNALING BETWEEN CENTRAL OFFICES EMPLOYING
MEANS TO PREVENT UNWANTED RINGING AND TO
PROVIDE PROMPT DISCONNECTION OF
RINGING SIGNALS

July 23, 1968 G. W. KINDER ET AL 3,394,230

PCM SIGNALING BETWEEN CENTRAL OFFICES EMPLOYING MEANS TO PREVENT UNWANTED RINGING AND TO PROVIDE PROMPT DISCONNECTION OF RINGING SIGNALS

Filed Dec. 14, 1964 5 Sheets-Sheet 3

PCM SIGNALING BETWEEN CENTRAL OFFICES EMPLOYING MEANS TO PREVENT UNWANTED RINGING AND TO PROVIDE PROMPT DISCONNECTION OF RINGING SIGNALS

Filed Dec. 14, 1964

FIG. 5

| | SUBSCRIBER ORIGINATING | | | | | | | | | |
|---|---|---|---|---|---|---|---|---|---|---|
| | SERVING OFFICE-FIG. 2 | | | | | LOCAL OFFICE -FIG. 3 | | | | |
| | RELAY | | | TRANSMIT | | RELAY | | | TRANSMIT | |
| | LC | LH | RG | DI | D8 | TG | RR | RG' | DI | D8 |
| IDLE | RELEASED | OPERATED | RELEASED | 0 | * | RELEASED | OPERATED | RELEASED | 1 | 0 |
| SUB. GROUNDS R | RELEASED | OPERATED | OPERATED | 0 | * | RELEASED | OPERATED | OPERATED | 1 | 1 |
| CO GROUNDS T | RELEASED | OPERATED | OPERATED | 1 | 0 | OPERATED | OPERATED | OPERATED | 1 | 1 |
| SUB. CLOSES LOOP & REMOVES GRD. ON R | OPERATED | OPERATED | OPERATED | 1 | 0 | OPERATED | OPERATED | RELEASED | 0 | * |
| 100 MS DELAY | OPERATED | OPERATED | RELEASED | 1 | 0 | OPERATED | OPERATED | RELEASED | 0 | * |
| 50 MS DELAY | OPERATED | RELEASED | RELEASED | 0 | * | OPERATED | OPERATED | RELEASED | 0 | * |
| SUB DIALS {LOOP OPENS | RELEASED | OPERATED | RELEASED | 0 | * | OPERATED | OPERATED | RELEASED | 1 | 0 |
| SUB DIALS {LOOP CLOSES | OPERATED | OPERATED | RELEASED | 0 | * | OPERATED | OPERATED | RELEASED | 0 | * |
| 150 MS DELAY | OPERATED | RELEASED | RELEASED | 0 | * | OPERATED | OPERATED | RELEASED | 0 | * |
| TALKING | OPERATED | RELEASED | RELEASED | 0 | * | OPERATED | OPERATED | RELEASED | 0 | * |

* RANDOM-UNDER CONTROL OF ENCODER

PCM SIGNALING BETWEEN CENTRAL OFFICES EMPLOYING MEANS TO PREVENT UNWANTED RINGING AND TO PROVIDE PROMPT DISCONNECTION OF RINGING SIGNALS

Filed Dec. 14, 1964 5 Sheets-Sheet 5

FIG. 6

| | SUBSCRIBER TERMINATING | | | | | | | | | |
|---|---|---|---|---|---|---|---|---|---|---|
| | SERVING OFFICE - FIG. 2 | | | | | LOCAL OFFICE - FIG. 3 | | | | |
| | RELAY | | | TRANSMIT | | RELAY | | | TRANSMIT | |
| | LC | LH | RG | D1 | D8 | TG | RR | RG | D1 | D8 |
| IDLE | RELEASED | OPERATED | RELEASED | 0 | * | RELEASED | OPERATED | RELEASED | 1 | 0 |
| CO GROUNDS T | RELEASED | OPERATED | RELEASED | 1 | 0 | OPERATED | OPERATED | RELEASED | 1 | 0 |
| CO RINGS | RELEASED | OPERATED | RELEASED | 1 | 1 | OPERATED | RELEASED | RELEASED | 1 | 0 |
| CO STOPS RINGING | RELEASED | OPERATED | RELEASED | 1 | 0 | OPERATED | OPERATED | RELEASED | 1 | 0 |
| CO RINGS AGAIN | RELEASED | OPERATED | RELEASED | 1 | 1 | OPERATED | RELEASED | RELEASED | 1 | 0 |
| SUB. ANSWERS | OPERATED | OPERATED | RELEASED | 1 | 1 | OPERATED | OPERATED | RELEASED | 0 | * |
| 150 MS DELAY | OPERATED | RELEASED | RELEASED | 0 | * | OPERATED | OPERATED | RELEASED | 0 | * |
| TALKING | OPERATED | RELEASED | RELEASED | 0 | * | OPERATED | OPERATED | RELEASED | 0 | * |

* RANDOM - UNDER CONTROL OF ENCODER 3,394,230

PCM SIGNALING BETWEEN CENTRAL OFFICES EMPLOYING MEANS TO PREVENT UNWANTED RINGING AND TO PROVIDE PROMPT DISCONNECTION OF RINGING SIGNALS

George W. Kinder, Reynoldsburg, Ohio, and Albert C. Longton, North Andover, Mass., assignors to Bell Telephone Laboratories, Incorporated, New York, N.Y., a corporation of New York Filed Dec. 14, 1964, Ser. No. 418,212
6 Claims. (Cl. 179—15)

This invention relates generally to pulse type communication systems and more particularly to pulse code modulation systems used between telephone central offices to provide so-called foreign exchange circuits.

In the telephone plant, a foreign exchange circuit permits a subscriber to be given service from a central office other than his own local central office. A permanent connection is established between the subscriber telephone set and the local office and all switching takes place at the remote or serving office. As a result, subscriber signaling information must be transmitted along with telephone messages to and from the subscriber telephone set by way of an interoffice trunk. Because subscriber signaling includes the transmission and control of subscriber ringing signals in addition to the transmission of such information on the D-C condition of the line as whether it is terminated in an open loop or a closed loop, special problems are presented when a pulse code modulation (henceforth referred to simply as PCM) system is used to provide the trunk connection between the two offices.

In the past, interoffice trunk signaling information has been transmitted over a PCM telephone system by adding a further digit space exclusive of the message digit spaces to each PCM code group and by removing control of the least significant message digit space from the PCM encoder when necessary and using it to transmit an additional signaling digit. Illustrative of such art are U.S. Patent 3,083,267, which issued Mar. 26, 1963, to D. C. Weller, and U.S. Patent 3,030,448, which issued Apr. 17, 1962, to D. J. Leonard and R. H. Shennum. Such arrangements are adaptable for foreign exchange use only to the extent that they may be used to transmit information on the D-C condition of the line. Transmission of subscriber ringing signals along with necessary restrictions to prevent unwanted ringing and to provide prompt tripping or ringing once the subscriber telephone set has shifted from its on-hook state to its off-hook state are not provided for.

The present invention solves these problems by providing special interlocks at both the local office and the serving office which not only place the relay connecting the local ringing current source to the subscriber telephone set under the control of the signaling digits received by the local office only under the desired conditions, but also lock that relay in its state disconnecting the local ringing current source from the subscriber telephone set as soon as the subscriber telephone set shifts from its on-hook state to its off-hook state. In accordance with one feature of the invention, before subscriber ringing information is transmitted over a PCM foreign exchange circuit, control of the least significant message digit space is removed from the encoder at the remote or serving office, a pulse (binary "1") is simultaneously transmitted toward the local office in the added or signaling digit space, and the ringing relay at the local office is placed under the control of the least significant message digit space. Then when a subscriber ringing signal is supplied to the remote or serving office for transmission to the subscriber telephone set, binary "1" is transmitted to the local office in the least significant message digit space and the local ringing current source there is connected to the subscriber telephone set. All danger of false ringing caused by the random appearance of binary "1" in the least significant message digit space while that digit space is under the control of the encoder at the serving or remote office is thereby avoided.

In accordance with another feature of the invention, as seen as the subscriber telephone set shifts from its on-hook state to its off-hook state, the ringing current relay at the local central office in a PCM foreign exchange circuit is provided with a locking path which causes it to disconnect the local ringing current source from the subscriber telephone set. There is, therefore, no chance of continued ringing once the subscriber telephone set has shifted to its off-hook state, even while the remote or serving office is still being signaled to trip ringing at its end of the trunk.

A more complete understanding of the invention may be obtained from a study of the following detailed description of a specific embodiment. In the drawings.

Figure 4:
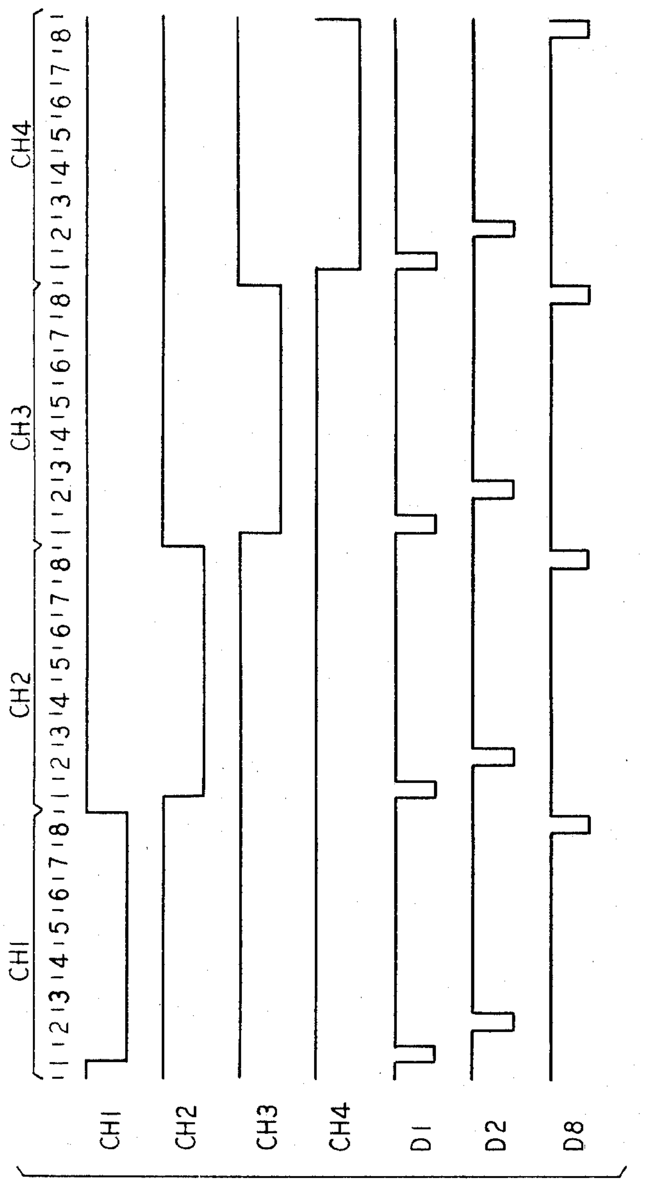
Figure 2:
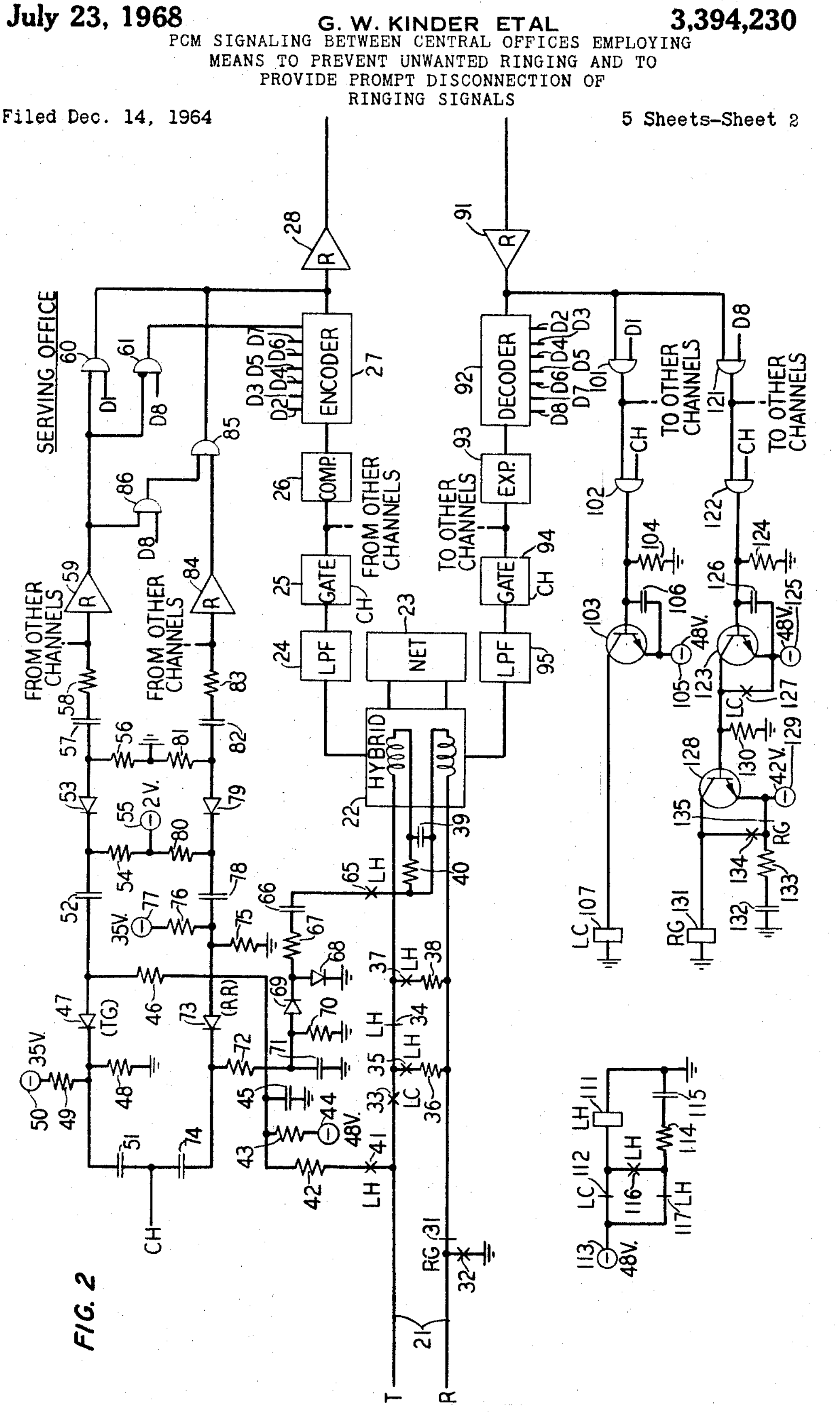
FIGS. 2 and 3 illustrate the remote and local office terminals, respectively, of a PCM foreign exchange circuit embodying the invention.
Figure 3:
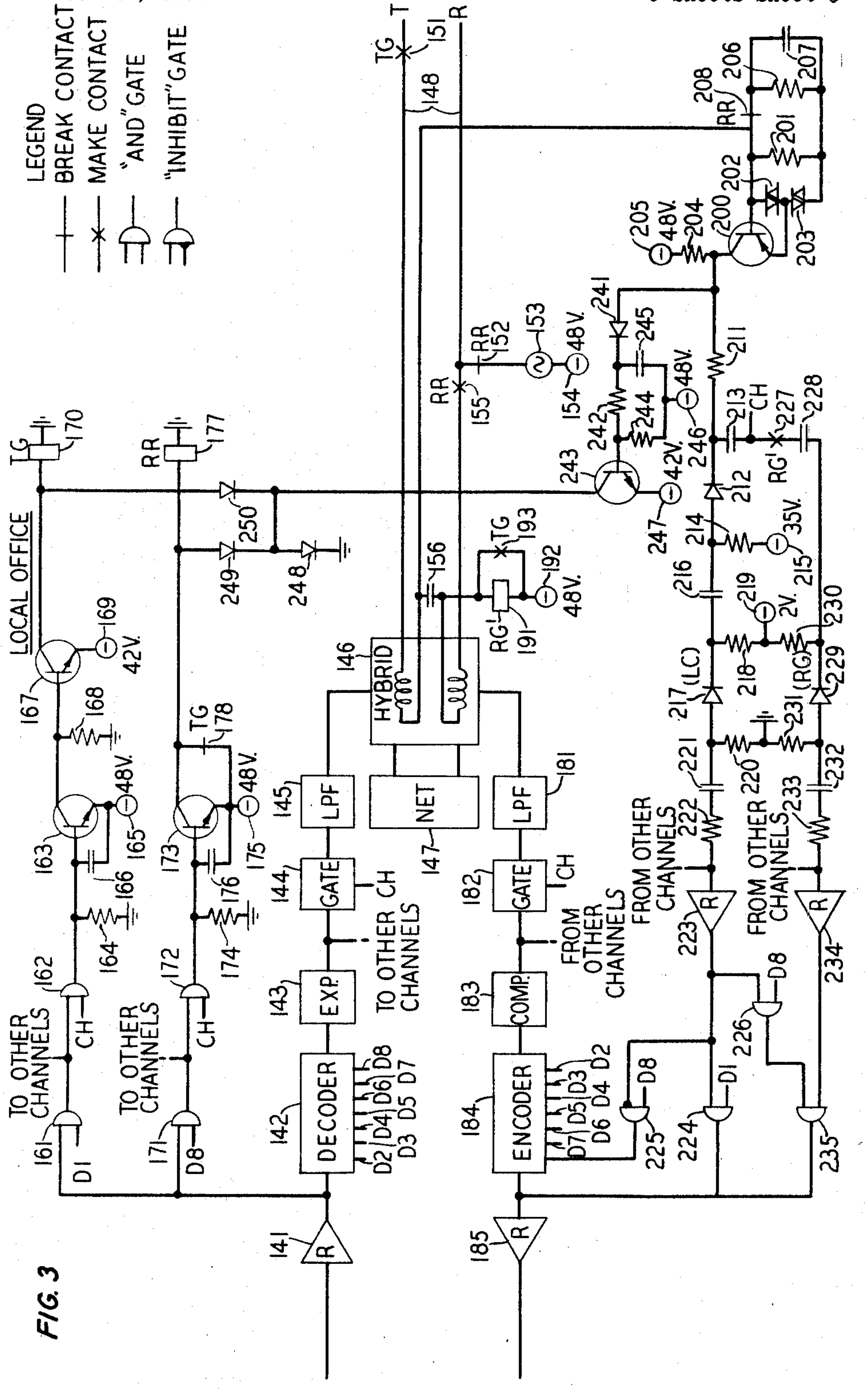

FIG. 4 illustrates the waveforms of some of the timing pulses used in the embodiment of the invention shown in FIGS. 2 and 3; and FIGS. 5 and 6 illustrate relay and signaling digit sequences involved in the operation of the embodiment of the invention shown in FIGS. 2 and 3.

Figure 1:
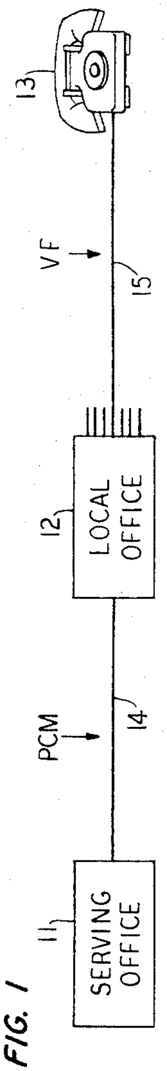
FIG. 1 is a block diagram of a foreign exchange circuit.

The over-all system layout of a PCM foreign exchange circuit is shown in FIG. 1. Three stations are shown, a remote or serving telephone central office 11, a local telephone central office 12, and a subscriber telephone set 13. The latter may be only a single telephone or, what is more likely, a number of telephones connected to the switchboard of a private branch exchange. Central offices 11 and 12 are typical telephone central offices and are connected by an interoffice trunk 14, which may be one channel of such a PCM telephone trunk system as the Bell System's T1 carrier system (described, for example, in the article "T1 Carrier System Terminals" by H. T. King and D. B. Penick, which appeared in the June 1963, issue of the Bell Laboratories Record). Subscriber telephone set 13 is permanently connected by a voice frequency two-wire line 15 to local office 12.

Typical of the applications of a foreign exchange circuit like that shown in FIG. 1 is one in which serving office 11 is located in a large city and both local office 12 and subscriber telephone set 13 are located in a nearby suburban community. Subscriber telephone set 13 may thus be called from a telephone in the city by a local call placed to its number in serving office 11 instead of only by a toll call to its number in local office 12. With a foreign exchange circuit, however, all switching takes place at the serving office and, as a result, subscriber signaling information instead of trunk signaling information is transmitted along with the telephone messages over PCM trunk 14.

The remote or serving office terminal of a PCM foreign exchange circuit embodying the present invention is illustrated in FIG. 2. This terminal is located at serving office 11 in FIG. 1. Only one channel (transmitting and receiving) of the PCM system is shown but points at which the signaling and message handling apparatus associated with the channels are connected to the common apparatus are indicated. The other channels may duplicate the one shown if they are part of other foreign exchange circuits or may, alternatively, be simply providing ordinary interoffice trunks between the two central offices.

The channel shown in FIG. 2 terminates in a two-wire voice frequency 21 at the remote or serving office where it is connected to the usual central office switching equipment. The opposite sides of line 21 are designated T (for "tip") and R (for "ring") respectively in accordance with traditional telephone practice. As illustrated, two-wire voice frequency line 21 from the serving office is connected to a hybrid coil 22 which is, in turn, terminated by a suitable balancing network 23. Transmission beyond hybrid coil 22 is on a four-wire basis, with the two directions of transmission separated by the conjugacy of hybrid coil 22. The transmitting path from hybrid coil 22 takes the form of a low-pass filter 24, a channel sampling gate 25, a compressor 26, a PCM encoder 27, and a transmitting regenerative pulse amplifier 28. Filter 24 serves to limit the top frequencies of the transmitted voice frequency message waves to 4 kilocycles, for example, and gate 25 is enabled by a so-called channel pulse at an 8 kilocycle rate. As shown in the first four lines of FIG. 4, the channel pulses assigned to one channel are displaced in time from those assigned to all channels, with the result that the input applied to compressor 26 is a time division multiplexed sequence of samples from all of the channels being transmitted, including the channel being used to provide the foreign exchange circuit. Samples from the other channels are interleaved in time with those from gate 25 at the input of compressor 26.

As is now common practice in many multichannel carrier systems, the PCM system illustrated in FIGS. 2 and 3 is provided with compandors in order to improve the signal-to-noise ratio of the system. In each direction of transmission, a compandor takes the form of a volume compressor at the transmitting terminal followed by a complementary volume expandor at the receiving terminal. In a PCM system, the effect of the compandor is to increase the percentage of the encoder volume range that is used by low volume messages, thereby reducing the amount of so-called quantizing noise at low volume levels.

Compressor 26 in the transmitting path in FIG. 2 is followed by PCM encoder 27. As shown, encoder 27 is a seven-digit encoder. It employs seven message digits per channel in the time scale, in other words, to translate each compressed sample applied to it into a binary code group of pulses (binary "1") and no-pulses (binary "0") occupying seven consecutive digit spaces. To control the timing of encoder 27, timing pulses which recur during the same numbered digit space of each code group are applied to the timing control leads D2 through D8. As shown in the next-to-last line of FIG. 4, the D2 lead is energized during the first digit space of each code group and controls the timing of the generation of the pulses or no-pulses in the most significant message digit space. As shown in the last line of FIG. 4, the D8 lead is energized (when permitted by other circuitry) during the seventh digit space of each code group and controls the timing of the generation of the pulses or no-pulse in the least significant message digit space. The D3 through D7 leads are energized in a similar manner during their respective digit spaces.

The transmitting regenerative pulse amplifier 28 is connected to receive the multiplexed binary code groups generated by encoder 27 and serves to insure uniformity of pulses for transmission over the line to the receiving equipment at the local office at the opposite end of the PCM line.

Near the left-hand end of the two-wire office line 21 in FIG. 2 a break contact 31 of a relay RG is connected in series with the R side of the line and a make contact 32 of the same relay is connected between the R side of the line and ground. Further to the right, a make contact 33 of a relay LC and a break contact 34 of a relay LH are connected in series with the T side of the line. Between contacts 33 and 34, a make contact 35 of relay LH and a resistor 36 are connected in series across line 21 to provide a D-C path during dialing operations. To the right of contact 34, a similar connection across line 21 is formed by a make contact 37 by relay LH and a resistor 38 to provide an idle circuit termination. As illustrated, the two line windings of hybrid coil 22 are joined by the parallel combination of a capacitor 39 and a resistor 40.

As will be explained later, relays RG, LC, and LH are all controlled from the local office at the opposite end of the PCM line and are used to ground the R side of line 21 and to reconstruct open loop and closed loop D-C conditions on line 21.

In the PCM terminal illustrated in FIG. 2, there are two signaling paths for transmitting subscriber signaling information toward the local office at the opposite end of the PCM line. From the T side of line 21 just to the left of contact 33, a make contact 41 of relay LH forms a series path with a pair of resistors 42 and 43 to a negative 48 volt source 44. A by-pass capacitor 45 to ground is connected from the junction between resistor 42 and 43. That same point is also connected through a resistor 46 to the anode of a diode 47. Diode 47 is a scanning gate which uses digit space D1, and additional digit space exclusive of the message digit spaces, to control a relay TG at the other end of the PCM line. It is normally reverse biased from negative 48 volt source 44 and from a biasing circuit connected to its cathode. The latter includes a resistor 48 returned from the cathode of diode 47 to ground and a resistor 49 connected from the cathode of diode 47 to a negative 35 volt source 50. The cathode of diode 47 is also connected to receive negative going channel pulses through a coupling capacitor 51.

The remainder of the signaling path from scanning gate diode 47 may be traced from the anode of diode 47 through a coupling capacitor 52 to the cathode of second diode 53. Diode 53 is forward biased by a resistor 54 connected from its cathode to a negative 2 volt source 55 and by a resistor connected from its anode to ground. The anode of diode 53 is also connected through a coupling capacitor 57 and an isolating resistor 58 to the input side of a pulse amplifier 59. The output side of amplifier 59 is connected both to one input terminal of an AND gate 60 and to the inhibit terminal of an INHIBIT gate 61. The remaining input terminals of gates 60 and 61 receive timing pulses during digit spaces D1 and D8, respectively. The output of AND gate 60 is supplied to the input side of transmitting regenerative pulse amplifier 28, while that of INHIBIT gate 61 is supplied to the D8 (least significant message digit) input lead of encoder 27.

The second signaling path for transmitting subscriber signaling information toward the local central office begins at the inner end of the R line winding of hybrid coil 22. A make contact 65 of relay LH, a coupling capacitor 66, and a resistor 67 are connected from the point to a voltage doubling rectifier composed of a pair of diodes 68 and 69. The cathode of diode 68 is grounded and the anode is connected to the junction between resistor 67 and the cathode of diode 69. The parallel combination of a resistor 70 and a capacitor 71 is connected from the anode of diode 69 to ground. Finally, the anode of diode 69 is connected through a resistor 72 to a cathode of a scanning gate diode 73.

The scanning gate based upon diode 73 in FIG. 2 uses digit space D8, the mathematically least significant of the message digit spaces, to detect applied subcriber ringing signals and control a relay RR at the opposite end of the PCM line. The cathode of diode 73 receives channel pulses through a coupling capacitor 74 and diode 73 itself is normally reverse biased from the ground connection on resistor 70 and a biasing circuit connected to its anode. The latter is made up of a resistor 75 connected from the cathode of diode 73 to ground and a resistor 76 connected from the cathode of diode 73 to a negative 35 volt source 77.

The rest of the signaling path from scanning gate diode 73 may be traced from the anode of diode 73 through a coupling capacitor 78 to the cathode of a diode 79. Diode 79 is normally forward biased by a resistor 80 connected from its cathode to negative 2 volt source 55 and by a resistor 81 connected from its anode to ground. The anode of diode 79 is also connected through coupling capacitor 82 and an isolating resistor 83 to the input side of a pulse amplifier 84. The output side of amplifier 84 is connected to one input terminal of an AND gate 85, the output terminal of which is connected to the input side of transmitting amplifier 28. Finally, an AND gate 86 has its output terminal connected to the other input terminal of AND gate 85. One input terminal of AND gate 86 is connected to the output side of pulse amplifier 59 and the other input terminal is connected to receive timing pulses during digit space D8.

Signaling path circuitry for other channels is, when appropriate, connected into the common transmitting path at the input sides or regenerative pulse amplifiers 59 and 84. Amplifiers 59 and 84, AND gates 60, 85, and 86, and INHIBIT gate 61 are shared on a time division basis by the outgoing signaling paths for all channels. Telephone message samples from other channels are supplied to the input side of compressor 26.

Of the signaling circuitry which has just been described, diode 47 is called the TG detector and monitors two-wire line 21 to determine whether or not the T side has been grounded. When the T side of line 21 is grounded (and relay LH is operated, as will be explained later), diode 47 becomes forward biased and passes the negative-going channel pulses. These pulses are also passed by diode 53 and regenerated by amplifier 59. As a result, AND gate 60 is energized and applies binary "1" to the outgoing PCM line during digit space D1, the added signaling digit space. At the same time, the inhibit lead of INHIBIT gate 61 is energized and control of digit space D8, the least significant message digit space, is removed from encoder 27. AND gate 86 is energized and passes pulses during digit space D8 to AND gate 85.

Of the same signaling circuitry, diode 73 is termed the RR detector and monitors line 21 to detect the application of subscriber ringing signals for transmission to the subscriber's telephone set served by the local office at the opposite end of the PCM line. When a ringing signal (normally a 20 cycle A-C wave) appears (and relay LH is still operated), it is rectified by diodes 68 and 69 and applied to forward bias diode 73. Diode 73 then passes channel pulses, as does forward biased diode 79, energizing AND gate 85. AND gate 85, in turn, applies binary "1" to the outgoing PCM line during digit space D8, the least significant message digit space.

The receiving circuitry in the remote or serving office PCM terminal illustrated in FIG. 2 is composed of a receiving regenerative pulse amplifier 91 connected to hybrid coil 22 through the series combination of a PCM decoder 92, and expandor 93, a channel gate 94, and a low-pass filter 95. Control pulses are applied to decoder 92 during digit spaces D2 through D8 to control decoder timing. Message distribution to the time division multiplexed receiving channels takes place at the output side of expandor 93. Like channel gate 25 in the transmitting path, channel gate 94 in the receiving path is driven by the channel pulses associated with this particular PCM channel. To the left of hybrid coil 22, transmission is once again on a two-wire basis through transmission line 21.

Signaling regeneration in the serving office PCM terminal shown in FIG. 2 is accomplished by two paths, both connected to the output side of receiving regenerative pulse amplifier 91. The first, which is controlled by the received contents of digit space D1, the added signaling digit space includes an AND gate 101 which has one input lead connected to the output side of receiving amplifier 91 and the other connected to receive timing pulses during digit space D1. The output terminal of AND gate 101 is connected to one input lead of a second AND gate 102. The other input lead of AND gate 102 is driven by the channel pulses of the channel illustrated. The received contents of digit space D1 are thus separated out of the incoming pulse train by AND gate 101 and those destined for this particular PCM channel are separted out by AND gate 102.

The ouput terminal of AND gate 102 in FIG. 2 is connected to the base electrode of a n-p-n transistor switch 103. Transistor 103 is normally conducting, since its emitter-base junction receives a forward bias provided by a resistor 104 connected between its base electrode and ground and a negative 48 volt source 105 connected to its emitter electrode. Negative-going output pulses from AND gate 102 thus reverse the bias on transistor 103 and cause it to switch to its non-conducting state. A capacitor 106 is connected between the base and emitter electrodes of transistor 103 to prevent it from switching at the channel pulse rate. Finally, the operating coil 107 of relay LC is connected between the collector electrode of transistor 103 and ground.

The operating coil 111 of relay LH is connected in series with a break contact 112 of relay LC between ground and a negative 48 volt source 113. A 150 millisecond time delay to prevent relay LH from following dialing pulses is provided by a resistor 114 and a capacitor 115 connected in series across operating coil 111 by a make contact 116 of relay LH. A break contact 117 of relay LH is connected between resistor 114 and negative 48 volt source 113.

The second signaling regeneration path in FIG. 2, which is controlled by the received contents of digit space D8, includes an AND gate 121 which has one input lead connected to the output side of receiving amplifier 91 and the other connected to receive timing pulses during digit space D8. A second AND gate 122, which separates out the pulses associated with the illustrated signaling channel, has one input lead energized from the output of AND gate 121 and the other connected to receive channel pulses. The output side of AND gate 122 is connected to the base electrode of an n-p-n transistor switch 123. Transistor 123, which is normally conducting, receives a forward bias across its emitter-base junction from a resistor 124 connected to ground from its base electrode and a negative 48 volt source 125 connected to its emitter electrode. Transistor 123 is switched to a non-conducting state when negative-going pulses appear at the output of AND gate 122. A capacitor 126 is connected between the emitter and base electrodes of transistor 123 to prevent the transistor from switching at the channel pulse rate. Finally, an interlock with relay LC is provided by a make contact 127 of relay LC connected between the emitter and collector electrodes of transistor 123.

The collector electrode of transistor 123 is connected to the base electrode of another n-p-n transistor switch 128. Transistor 128 is non-conducting when transistor 123 conducts. The emitter electrode of transistor 128 is connected to a negative 42 volt source 129, while the base is connected through the collector-emitter path of transistor 123 to negative 48 volt source 125. The emitter-base junction of transistor 128 is, therefore, normally reverse biased. A resistor 130 is connected between the base electrode of transistor 128 and ground, however, and when transistor 123 is non-conducting, it provides a forward biasing path for the emitter-base junction of transistor 128 and switches transistor 128 into its conducting state.

The operating coil 131 of relay RG is connected between the collector electrode of transistor 128 and ground. A 100 millisecond delay to slow up the release of relay RG is provided by a capacitor 132 and a resistor 133 which are connected across operating coil 131 by a make contact 134 of relay RG and between negative 42 volt source 129 and ground by a break contact 135 of relay RG.

The local office terminal of a PCM foreign exchange circuit embodying the invention is illustrated in FIG. 3. This terminal is located at local office 12 in FIG. 1. Again, the individual channel equipment for only one channel of the PCM system is shown, but points at which equipment associated with the remaining channels is connected are indicated.

In the receiving portion of the PCM terminal shown in FIG. 3, a receiving regenerative pulse amplifier 141 recovers and regenerates the pulse pattern transmitted by amplifier 28 in FIG. 2. The output of receiving amplifier 141 is passed through a PCM decoder 142, which is like decoder 92 in FIG. 2 and reconstructs the time division multiplexed samples of message waves encoded by PCM encoder 27 in FIG. 2. Control pulses are supplied to decoder 142 during digit spaces D2 through D8 to control decoder timing. The output of decoder 142 is passed then to expandor 143. Message distribution to each of the receiving channels takes place at the output side of expandor 143 as illustrated.

In the receiving channel illustrated in FIG. 3, the output side of expandor 143 is connected through a channel gate 144 and a low-pass filter 145 to a hybrid coil 146. The channel pulses of the channel concerned are applied to channel gate 144 to separate the message samples of this channel from those of others. Low-pass filter 145 removes the high frequency components from the message samples of this particular channel, leaving the message in substantially its original form. Hybrid coil 146 is terminated by a balancing network 147. To the right of hybrid coil 146 in FIG. 3, transmission is once again on a two-wire basis through a voice-frequency transmission line 148.

To complete one of the signaling paths from the serving office terminal illustrated in FIG. 2, the local office terminal in FIG. 3 has a make contact 151 of a relay TG connected in the T side of line 148. To complete the other, the R side of line 148 is connected by a break contact 152 of a relay RR to one side of a 20-cycle local ringing current source 153, the other side of which is connected to a negative 48 volt source 154. A make contact 155 of relay RR is connected in the R side of line 148 between break contact 152 and hybrid coil 146. A-C continuity is provided by a capacitor 156 connected between the two line windings of hybrid coil 146.

The signaling receiving circuits in FIG. 3 begin at the output side of receiving regenerative pulse amplifier 141. In one, controlled by the received contents of digit space D1, an AND gate 161 has one input lead connected to the output side of amplifier 141 and the other connected to receive timing pulses during digit space D1. The output side of AND gate 161 is connected to one input lead of a second AND gate 162. The other input lead of AND gate 162 is connected to receive the channel pulses of the channel concerned. Distribution to other signal receiving channels is made at the output side of AND gate 161.

The output side of AND gate 162 is connected to the base electrode of a n-p-n transistor switch 163. To make it normally conducting, transistor 163 receives a forward bias across its emitter-base junction from a resistor 164 connected from its base electrode to ground and from a negative 48 volt source 165 connected to its emitter electrode. Transistor 163 is switched to its non-conducting state by the negative-going output pulses (binary "1") from AND gate 162. A capacitor 166 is connected between the emitter and base electrodes of transistor 163 to prevent transistor 163 from switching with the channel pulses.

The collector electrode of transistor 163 is connected to the base electrode of a second n-p-n transistor switch 167. Transistor 167 is non-conducting while transistor 163 is conducting because of a negative 42 volt source 169 connected to its emitter electrode. A resistor 168 is connected from the base of transistor 167 to ground to make transistor 167 conducting when transistor 163 is shut off. To complete the signaling path, the operating coil 170 of relay TG is connected between the collector electrode of transistor 167 and ground. Relay TG operates when binary "1" is received in digit space D1 but releases when binary "0" is received.

In the second signaling received circuit in FIG. 3, an AND gate 171 has one input terminal connected to the output side of receiving amplifier 141 and the other connected to receive timing pulses during digit space D8. The output of AND gate 171 is connected to one input terminal of an AND gate 172. The other input terminal of AND gate 172 is connected to receive the terminal pulses of the channel illustrated. Distribution to the signaling received paths of other channels takes place at the output side of AND gate 171.

The output side of AND gate 172 in FIG. 3 is connected to the base electrode of an n-p-n transistor switch 173. Transistor 173 is normally conducting because of the forward bias placed across its emitter-base junction by a resistor 174 connected from its base electrode to ground and a negative 48 volt source 175 connected to its emitter electrode. When AND gate 172 is energized, its output (binary "1") is negative going to overcome the forward bias of transistor 173 and switch it to its non-conducting state. To prevent transistor 173 from switching at the channel pulse rate, a capacitor 176 is connected between the base and emitter electrodes of transistor 173. To complete the signaling path, the operating coil 177 of relay RR is connected between the collector electrode of transistor 173 and ground. An interlock in accordance with a feature of the invention is provided by a break contact 178 of relay TG connected between the emitter and collector electrodes of transistor 173, thereby preventing relay RR from releasing and applying ringing current to line 148 in response to binary "1" in digit space D8 except when binary "1" is also received in digit space D1.

The message transmitting portion of the local office PCM terminal shown in FIG. 3 is made up of the series combination of a low-pass filter 181, a channel gate 182, a compressor 183, and a PCM encoder 184 connecting the transmitting terminal of hybrid coil 146 to a transmitting regenerative pulse amplifier 185. These elements are generally like low-pass filter 24, channel gate 25, compressor 26, and encoder 27 in FIG. 2 and function in a similar manner.

To control the signaling regenerators in the serving office terminal at the opposite end of the PCM line, the local office terminal in FIG. 3 has a pair or signaling detectors. One of these, which detects the grounding of the R side of line 148 by the subscriber telephone set, includes the operating coil 191 of a relay RG. Operating coil 191 is connected to a negative 48 volt source 192 form the inner terminal of the R line winding of hybrid coil 146. A make contact 193 of relay TG is connected across operating coil 191 to prevent relay RG from operating except when relay TG is released.

The other of the two signaling detectors in FIG. 1 operates in response to shifts of the subscriber telephone set between on-hook and off-hook states. The inner end of the T line winding of hybrid coil 146 is connected to the base electrode of a p-n-p transistor switch 200, to ground through a resistor 201, and to ground through the series combination of at least two varistors 202 and 203. Varistor 203 may, if desired, actually be a succession of two or more individual series varistors if a greater biasing voltage is required for transistor 200 than can be provided from one alone. As illustrated, the emitter of transistor 200 is connected to the junction between varistors 202 and 203. The collector electrode of transistor 200 is connected through a resistor 204 to a negative 48 volt source 205. To reduce detector sensitivity during ringing, a break contact of relay RR and the parallel combination of a resistor 206 and a capacitor 207 are connected in series between base electrode of transistor 200 and ground.

From the collector electrode of transistor 200 in FIG. 3, a resistor 211 is connected to the cathode of a scanning diode 212. The cathode of diode 212 is also connected to receive the channel pulses associated with the illustrated channel through a coupling capacitor 213. Diode 212 is forward biased and conducting as long as transistor 200 remains in a non-conducting state, receiving this bias from a resistor 214 connected from its anode to a negative 35 volt source 215 and from the connection of negative 48 volt source 205 to its cathode. The anode of diode 212 is also connected through a coupling capacitor 216 to the cathode of a second diode 217. Diode 217 is forward biased by a resistor 218 connected from its cathod to a negative 2 volt source 219 and by a resistor 220 connected from its anode to ground. The anode of diode 217 is also connected through a coupling capacitor 221 and an isolating resistor 222 to the input side of a regenerative pulse amplifier 223. So that amplifier 223 can serve as common equipment for the corresponding signaling paths of other channels as well, these paths are connected at the input side of amplifier 223, as illustrated.

The output side of regenerative pulse amplifier 223 in FIG. 3 is connected to one input terminal of an AND gate 224, to the inhibit input terminal of an INHIBIT gate 225, and to one input terminal of an AND gate 226. The other input terminal of AND gate 224 is driven by timing pulses during digit space D1, causing each pulse at the output of amplifier 223 to be passed to transmitting amplifier 185 during digit space D1. The other input terminal of inhibit gate 225 is driven by timing pulses during digit space D8. As a result, digit space D8 is removed from the control of encoder 184 whenever a pulse (binary "1") appears at the output side of amplifier 223 and restored to be control of encoder 184 at other times. The other input lead of AND gate 226 is supplied with timing pulses during digit space D8.

Control of the remaining path for the transmission of signaling information in FIG. 3 is provided by a connection from the channel pulse source through a make contact 227 of relay RG' and a coupling capacitor 228 to the cathode of a diode 229. Like diode 217, diode 229 is forward biased. This bias is provided by a resistor 230 connected from the cathode of diode 229 to negative 2 volt source 219 and by a resistor 231 connected from the anode of a diode 229 to ground. The anode of diode 229 is also connected through a coupling capacitor 232 and an isolating resistor 233 to the input side of a regenerative pulse amplifier 234. The input side of amplifier 234 receives signaling pulses from the other channels as well and its output, which includes time division multiplexed pulses from all channels, is applied to one terminal of an AND gate 235, the other terminal of which is supplied with pulses from the output terminal of AND gate 226. Because of the operation of the latter gate, AND gate 235 is supplied with timing pulses during digit space D8 only when pulses are also present during digit space D1. The output side of AND gate 235 is connected directly to the input side of transmitting amplifier 185 in FIG. 3.

The final signaling interlock in FIG. 3 is driven by transistor 200, the collector electrode of which is connected to the anode of a diode 241. The cathode of diode 241 is, in turn, connected through a resistor 242 to the base electrode of an n-p-n transistor switch 243. A resistor 244 is connected from the base electrode of transistor 243 and a capacitor 245 from the cathode of diode 241 to a negative 48 volt source 246. The emitter electrode of transistor 243 is connected to a negative 42 volt source 247, reverse biasing the emitter-base junction of transistor 243. The collector electrode of transistor 243 is connected to the anode of a diode 248 and to the cathodes of a pair of additional diodes 249 and 250. The cathode of diode 248 is grounded and the anodes of diodes 249 and 250 are connected to the collector electrodes of transistors 173 and 167, respectively, in the control paths for operating coils 170 and 177 of relays TG and RR.

Transistor 243 and its immediately associated components in FIG. 3 constitute a slow release circuit to hold relays TG and RR in their operated states during dialing and also assure, in accordance with a feature of the invention, a fast ringing trip by cutting off ringing at the local end of the PCM interoffice trunk.

Operation of the embodiment of the invention illustrated in FIGS. 2 and 3 may be best understood with the aid of the charts constituting FIGS. 5 and 6. Of these, FIG. 5 is a chart illustrating the sequence of operations involved when a call is originated by the subscriber telephone set served from the PCM foreign exchange circuit and FIG. 6 is a chart illustrating the chart sequence of operations involved when the call is originated elsewhere and directed to the subscriber telephone set served from the PCM foreign exchange circuit. The functions needed to serve both ground start (required in connection with certain private branch exchange trunks and wide area telephone service lines) and non-ground start subscriber equipment are provided.

As shown in the top sequence line in both FIGS. 5 and 6, when the PCM interoffice trunk providing foreign exchange service is idle, relays LC and RG at the switching office terminal in FIG. 2 are released, relay LH is operated, binary "0" is being transmitted toward the local office in digit space D1, and digit space D8 is under the control of encoder 27. At the same time, relays TG and RG' at the local office terminal in FIG. 3 are released, relay RR is operated, binary "1" is being transmitted toward the serving office in digit space D1, and binary "0" is being transmitted in digit space D8.

As shown in FIG. 5, when a ground start subscriber originates a call over a foreign exchange circuit embodying the invention, his subscriber telephone set grounds the R side of line 148 in FIG. 3 when he lifts his receiver, causing current from negative 48 volt source 192 to flow through operating coil 191 of relay RG'. Relay RG' operates, causing make contact 227 to close and binary "1" to be transmitted toward the serving office in digit space D8. At the serving office terminal in FIG. 2, binary "1" is detected in digit space D8 and relay RG operates, reconstructing the grounded R condition of line 21.

As soon as the switching equipment at the serving office senses the ground on the R side of line 21, it grounds the T side and closes the loop terminating line 21. The ground on the T side of line 21 places a forward bias on TG scanning gate diode 47, permitting channel pulses to be passed and causing binary "1" to be transmitted toward the local office in digit space D1. At the local office, binary "1" is received in digit space D1 and the resulting negative-going pulse at the output of AND gate 162 causes a reverse bias to be placed on the emitter-base junction of transistor 163. The path to the base of transistor 167 from negative 48 volt source 165 is then opened and transistor 167 conducts, operating relay TG. Make contact 151 of relay TG then provides continuity on the T side of line 148.

As soon as relay TG operates at the local office terminal in FIG. 3, the subscriber telephone set closes the loop terminating line 148 and removes the ground on the R side of the line. At the same time. make contact 193 of relay TG shorts out operating coil 191 of relay RG', causing relay RG' to release and break the channel pulse transmission path through its make contact 227. In addition, a negative 48 volt potential from source 192 is applied, through the closed loop terminating line 148, to the base electrode of transistor 200, switching that transistor into its conducting state. The low impedance emitter-collector path of transistor 200 then places a potential near ground on the anode of LC scanning gate diode 212, reverse biasing that diode and blocking the transmission of channel pulses. Thus, not only is binary "0" transmitted toward the serving office in digit space D1 but control of digit space D8 is restored to encoder 184. At the serving office PCM terminal in FIG. 2, failure to receive binary "1" in digit space D1 operates relay LC. The consequent closing of make contact 33 provides continuity in line 21, while the opening of break contact 112 causes timing capacitor 115 to begin discharging through the operating coil 111 of relay LH. At the same time, make contact 127 of relay LC also closes, applying a negative 48 volt potential from source 125 to the base electrode of transistor 128. Transistor 128 stops conducting, isolating operating coil 131 of relay RG from source 129. Operating capacitor 132 then begins to discharge through operating coil 131 of relay RG.

One hundred milliseconds later, timing capacitor 132 has discharged sufficiently to release relay RG, causing contacts 31 and 32 to remove ground from and restore continuity to the R side of line 21. An additional fifty milliseconds later, operating capacitor 115 has discharged sufficiently to release relay LH. Make contacts 41 and 65 of relay LH then open to remove the TG and RR scanning gates from line 21, transmit binary "0" toward the local office in digit space D1, and restore control of digit space D8 to encoder 27. At the local office terminal in FIG. 3, relays TG and RR are held operated by a path provided through diodes 250 and 249 and transistor 243. The potential near ground at the collector electrode of transistor 200 forward biases diode 241 and places a forward bias on the emitter-base junction of transistor 243.

At this point, the central office switching equipment at the serving office senses the continuity provided to line 21 by the release of relay LH in FIG. 2 and transmits dial tone. The dial tone is sampled and encoded in the manner of voice message waves and transmitted over the PCM line to the local office, where it is reconstructed in substantially its original form and supplied to the subscriber telephone set. As the subscriber dials, the loop terminating line 148 at the local office terminal in FIG. 3 alternately opens and closes. As the subscriber loop opens, the negative 48 volt potential from source 192 is removed from the base of transistor 200. The emitter-base junction of transistor 200 becomes reverse biased once again and a negative 48 volt potential from source 205 is supplied to the cathode of LC scanning gate diode 212. Diode 212 then passes channel pulses and binary "1" is transmitted toward the serving office in digit space D1. Since relay RG′ remains released, binary "0" is transmitted toward the serving office in digit space D8. At the serving office illustrated in FIG. 2, receipt of binary "1" in digit space D1 causes relay LC to release and relay LH to operate. The opening of make contact 33 of relay LC trips dial tone at the serving office.

As the subscriber loop closes during dialing, a negative 48 volt potential from source 192 is again applied to the base of transistor 200, forward biasing the emitter-base junction and switching transistor 200 to its conducting state. The potential near ground applied to the cathode of diode 212 reverse biases diode 212 and causes binary "0" to be transmitted toward the serving office in digit space D1 and control of digit space D8 to be restored to encoder 184. The time constant provided by resistors 242 and 244 and capacitors 245 prevents transistor 243 from releasing relays TG and RR during dialing, while that provided by resistor 114 and capacitor 115 prevents the release of relay LH during dialing. As a result, dial pulses generated at the subscriber telephone set are followed at the serving office PCM terminal by relay LC, where make contact 33 effectively reconstructs them for the serving office switching equipment. Relay LH, on the other hand, remains operated during dialing to provide a D-C path across line 21 and to provide a termination for hybrid coil 22 to prevent oscillations around the transmission loop.

Upon completion of dialing, there is a one hundred and fifty millisecond delay while capacitor 115 discharges through operating coil 111 of relay LH at the serving office terminal in FIG. 2. Relay LH then releases, removing the shunt paths across line 21 in FIG. 2 and establishing the talking path through hybrid coil 22. The TG and RR detectors are disconnected to prevent line unbalance during talking periods.

The operation of the embodiment of the invention illustrated in FIGS. 2 and 3 for a non-ground start subscriber is similar to that which has been described but begins at the point the loop terminating line 148 in FIG. 2 is closed, with ground already removed from the R side of the line. Digit space D8, the least significant message digit space, is not used for signaling in the direction from the local office terminal toward the serving office, but remains under the control of PCM encoder 184.

The sequence of operations which take place in the embodiment of the invention illustrated in FIGS. 2 and 3 during a call placed to the serving office and received by a ground start foreign exchange subscriber is illustrated in FIG. 6. As shown, the switching equipment at the serving office initiates the sequence by grounding the T side of line 21 in FIG. 2. When this happens,TG scanning gate diode 47 becomes forward biased and passes channel pulses which, in turn, cause binary "1" to be transmitted toward the local office in digit space D1. At the same time, in accordance with a feature of the invention, the pulses from amplifier 59 at the inhibit input lead of inhibit gate 61 block D8 timing pulses and remove control of digit space D8 from encoder 27. AND gate 86 is enabled during digit space D8 but, since RR scanning gate diode 73 remains reverse biased, binary "0" is transmitted in digit space D8. At the local office terminal in FIG. 3, receipt of binary "1" in digit space D1 shuts off transistor 163, turns on transistor 167, and operates relay TG. Make contact 151 of relay TG provides continuity in the T side of line 148 and break contact 178 enables transistor 173 in the control path for relay RR. This is the point, parenthetically, at which the sequence of operations begins for a non-ground start subscriber.

The next step is the application, by the switching equipment at the serving office, of a subscriber ringing signal to the serving office PCM terminal for transmission over the foreign exchange circuit to the subscriber telephone set. As has already been explained, this ringing signal is normally in the form of a 20 cycle A-C wave which may, but need not, have a D-C component. This 20 cycle wave is rectified by the doubler-rectifier formed by diodes 68 and 69 in FIG. 2, yielding a sufficiently large negative voltage at the cathode of RR scanning gate diode 73 to forward bias that diode. When diode 73 becomes forward biased, it passes channel pulses to amplifier 84, where they are regenerated. The output pulses from amplifier 84 enable AND gate 85 during digit space D8, causing digit binary "1" to be transmitted toward the local office in digit space D8. At the local office terminal shown in FIG. 3, receipt of binary "1" in digit space D8 causes AND gate 172 to apply a negative pulse to the base electrode of transistor 173. Transistor 173 is thereby switched to its non-conducting state and relay RR releases. When relay RR releases, its break contact 152 connects the R side of line 148 to the local subscriber ringing current source 153. The called subscriber telephone set then rings, just as if the subscriber ringing signal from the serving office had been applied over a direct voice frequency connection.

During each interval between rings at the serving office, RR scanning gate diode 73 in FIG. 2 becomes reverse biased once more and blocks the transmission of channel pulses. During such intervals, binary "0" is transmitted toward the local office in digit space D8. At the local office terminal shown in FIG. 3, binary "0" received in digit space D8 removes the reverse bias from the emitter-base junction of transistor 173 and the forward bias that is restored switches transistor 173 back to its conducting state, operating relay RR and disconnecting local ringing signal source 153 from line 148.

As soon as the called subscriber answers his telephone, shifting the subscriber telephone set from its on-hook state to its off-hook state, a low impedance or closed loop termination is applied to line 148 in FIG. 3. If this takes place between rings, a negative 48 volt potential from source 192 is applied, by way of the low impedance termination on line 148, to the base electrode of transistor 200, switching that transistor into its conducting state. The voltage at the collector electrode of transistor 200 rises toward ground, forward biasing diode 241 and reverse biasing LC scanning gate diode 212. Transistor 243 turns on, applying a negative 42 volt potential from source 247 to the cathodes of diodes 249 and 250. Diodes 249 and 250 are forward biased and provide holding paths for relays TG and RR. Since relay RR can no longer release, ringing is thereby tripped, in accordance with a feature of the invention, at the local office terminal. At the same time, LC scanning gate diode 212 blocks channel pulses, causing binary "0" to be transmitted toward the serving office in digit space D1 and causing control of digit space D8 to be restored to encoder 184. At the serving office terminal in FIG. 2, receipt of binary "0" in digit space D1 reverse biases the emitter-base junction of transistor 103. Transistor 103 switches off, releasing relay LC. The restoration of continuity to line 21 causes the office switching equipment to trip ringing at the serving office.

If the subscriber telephone set shifts to its off-hook state during the application of a subscriber ringing signal, i.e., during a ring, the sequence of operations is the same except that a negative 48 volt potential from source 154 provides the forward bias on the emitter-base junction of transistor 200. The resulting negative potential at the cathode of diode 249 operates and holds relay RR. Ringing is thus tripped immediately, even in mid-ring, at the local office terminal.

When relay LC in FIG. 2 operates in response to binary "0" received in digit space D1, break contact 112 opens and timing capacitor 115 begins discharging through operating coil 111 of relay LH. After a one hundred and fifty millisecond delay, relay LH releases, completing the talking path to hybrid coil 22 from line 21 and opening the paths through make contacts 41 and 65 to the TG and RR scanning gates. With the paths through make contacts 41 and 65 opened, scanning gate diodes 47 and 73 are reverse biased and block the transmission of channel pulses. Binary "0" is transmitted toward the local office in digit space D1 and digit space D8 is removed from the control of encoder 27. The entire foreign exchange circuit is then ready for the transmission of voice messages in both directions.

It is to be understood that the above-described arrangement is illustrative of the application of the principles of the invention. Numerous other embodiments may be devised by those skilled in the art without departing from the spirit and scope of the invention.

What is claimed is:

1. In a pulse code modulation telephone system serving a subscriber telephone set from a remote central office by way of a local central office, said subscriber telephone set having both an on-hook state and an off-hook state, an encoder at said remote central office for converting telephone message samples into successive binary code groups having a predetermined number of digit spaces each for transmission to said local central office, signaling means at said remote central office for adding a further digit space to each code group exclusive of said message digit spaces, means at said remote central office for removing control of the least significant of said message digit spaces from said encoder and simultaneously transmitting a predetermined binary indication in said further digit space, means at said remote central office for transmitting a predetermined binary indication in said least significant message digit space when a ringing signal is suppled to said remote central office for transmission to said subscriber telephone set, a local ringing current source at said local central office, means at said local central office for connecting said local ringing current source to said subscriber telephone set when said binary indication is received in both said least significant message digit space and said further digit space, and means at said local central office for disconnecting said local ringing signal source from said subscriber telephone set when said subscriber telephone set shifts from its on-hook state to its off-hook state.

2. In a pulse code modulation telephone system serving a subscriber telephone set from a remote central office by way of a local central office, said subscriber telephone set having both an on-hook state and an off-hook state, an encoder at said remote central office for converting telephone message samples into successive binary code groups having a predetermined number of digit spaces each for transmission to said local central office, signaling means at said remote central office for adding a further digit space to each code group exclusive of said message digit spaces, means at said remote central office for removing control of the least significant of said message digit spaces from said encoder and simultaneously transmitting a predetermined binary indication in said further digit space, means at said remote central office for transmitting a predetermined binary indication in said least significant message digit space when a ringing signal is supplied to said remote central office for transmission to said subscriber telephone set, a local current source at said local central office, a relay at said local central office having one state in which it connects said local ringing current source to said subscriber telephone set and another state in which it disconnects said local ringing current source from said subscriber telephone set, means at said local central office for placing said relay under the control of the received content of said least significant message digit space only when said binary indication is received in said further digit space, means at said local central office for switching said relay to its first mentioned state when said binary indication is received in said least significant message digit space, and means at said local central office for switching said relay to its second mentioned state when said subscriber telephone set shifts from its on-hook state to its off-hook state.

3. In a pulse code modulation telephone system serving a subscriber telephone set from a remote central office by way of a local central office, said subscriber telephone set having both an on-hook state and an off-hook state, an encoder at said remote central office for converting telephone message samples into successive binary code groups having a predetermined number of digit spaces each for transmission to said local central office, signaling means at said remote central office for adding a further digit space to each code group exclusive of said message digit space, means at said remote central office for removing control of the least significant message digit space from said encoder and simultaneously transmitting binary "1" in said further digit space, means at said remote central office for transmitting binary "1" in said least significant message digit space when a ringing signal is supplied to said remote central office for transmission to said subscriber telephone set, a local ringing current source at said local central office, a relay at said local central office connecting said local ringing current source to said subscriber telephone set when released and disconnecting said local ringing current source from said subscriber telephone set when operated, means at said local central office for placing said relay under the control of the received content of said least significant message digit space only when binary "1" is received in said further digit space, means at said local central office for releasing said relay when binary "1" is received in said least significant message digit space, and means at said local central office for operating said relay when said subscriber telephone set shifts from its on-hook state to its off-hook state.

4. In a pulse code modulation telephone system serving a subscriber telephone set from a remote central office by way of a local central office, said subscriber telephone set having both an on-hook state and an off-hook state, encoders at both of said central offices for converting telephone message samples into successive binary code groups having a predetermined number of digit spaces each for transmission to the other offices, signaling means at both of said central offices for adding a further digit space to each code group exclusive of said message digit spaces, means at said remote central office for removing control of the least significant of said message digit spaces transmitted to said local central office from the encoder at said remote central office and simultaneously transmitting a first of two binary indications to said local central office in said further digit space, means at said remote central office for transmitting a pedetermined binary indication to said local central office in said least significant message digit space when a ringing signal is supplied to said remote central office for transmission to said subscriber telephone set, a local ringing current source at said local central office, means at said local central office for connecting said local ringing current source to said subscriber telephone set when said predetermined binary indication is received from said remote central office in said least significant message digit space and said first binary indication is received from said remote central office in said further digit space, means at said local central office for disconnecting said local ringing signal source from said subscriber telephone set when said subscriber telephone set shifts from its on-hook state to its off-hook state, means at said local central office for transmitting a predetermined binary indication to said remote central office in said further digit space when said subscriber telephone set shifts from its on-hook state to its off-hook state, and means at said remote central office for restoring control of said least significant message digit space to the encoder and simultaneously transmitting the second of said two binary indications to said local central office in said further digit space when said predetermined binary indication is received from said local central office in said further digit space.

5. In a pulse code modulation telephone system serving a subscriber telephone set from a remote central office by way of a local central office, said subscriber telephone set having both an on-hook state and an off-hook state, encoders at both of said central offices for converting telephone message samples into successive binary code groups having a predetermined number of digit spaces each for transmission to the other offices, signaling means at both of said central offices for adding a further digit space to each code group exclusive of said message digit spaces, means at said remote central office for removing control of the least significant of said message digit spaces transmitted to said local central office from the encoder at said remote central office and simultaneously transmitting a first of two binary indications to said local central office in said further digit space, means at said remote central office for transmitting a predetermined binary indication to said local central office in said least significant message digit space when a ringing signal is supplied to said remote central office for transmission to said subscriber telephone set, a local ringing current source at said local central office, a relay at said local central office having one state in which it connects said local ringing current source to said subscriber telephone set and another state in which it disconnects said local ringing current source from said subscriber telephone set, means at said local central office for placing said relay under the control of the received content of said least significant message digit space only when said first binary indication is received in said further digit space; means at said local central office for switching said relay to its first mentioned state when said predetermined binary indication is received from said remote central office in said least significant message digit space, means at said local central office for switching said relay to its second mentioned state when said subscriber telephone set shifts from its on-hook state to its off-hook state, means at said local central office for transmitting a predetermined binary indication to said remote central office in said further digit space when said subscriber telephone set shifts from its on-hook state to its off-hook state, and means at said remote central office for restoring control of said least significant message digit space to the encoder and simultaneously transmitting the second of said two binary indications to said local central office in said further digit space when said predetermined binary indication is received from said local central office in said further digit space.

6. In a pulse code modulation telephone system serving a subscriber telephone set from a remote central office by way of a local central office, said subscriber telephone set having both an on-hook state and an off-hook state, encoders at both of said central offices for converting telephone message samples into successive binary code groups having a predetermined number of digit spaces each for transmission to the other offices, signaling means at both of said central offices for adding a further digit space to each code group exclusive of said message digit spaces, means at said remote central office for removing control of the least significant of said message digit spaces transmitted to said local central office from the encoder at said remote central office and simultaneously transmitting binary "1" to said local central office in said further digit space, means at said remote central office for transmitting binary "1" to said local central office in said least significant message digit space when a ringing signal is supplied to said remote central office for transmission to said subscriber telephone set, a local ringing current source at said local central office, a relay at said local central office connecting said local ringing current source to said subscriber telephone set when released and disconnecting said local ringing current source from said subscriber telephone set when operated, means at said local central office for placing said relay under the control of the received content of said least significant message digit space only when binary "1" is received in said further digit space, means at said local central office for releasing said relay when binary "1" is received from said remote central office in said least significant message digit space, means at said local central office for operating said relay when said subscriber telephone set shifts from its on-hook state to its off-hook state, means at said local central office for transmitting binary "0" to said remote central office in said further digit space when said subscriber telephone set shifts from its on-hook state to its off-hook state, and means at said remote central office for restoring control of said least significant message digit space to the encoder and simultaneously transmitting binary "0" to said local central office in said further digit space when binary "0" is received from said local central office in said further digit space.

No references cited.

ROBERT L. GRIFFIN, *Primary Examiner.*

R. E. GORDON, *Assistant Examiner.*